May 28, 1968  H. DECOTO ETAL  3,385,315
IRRIGATION SYSTEM
Filed Feb. 16, 1965
2 Sheets-Sheet 1
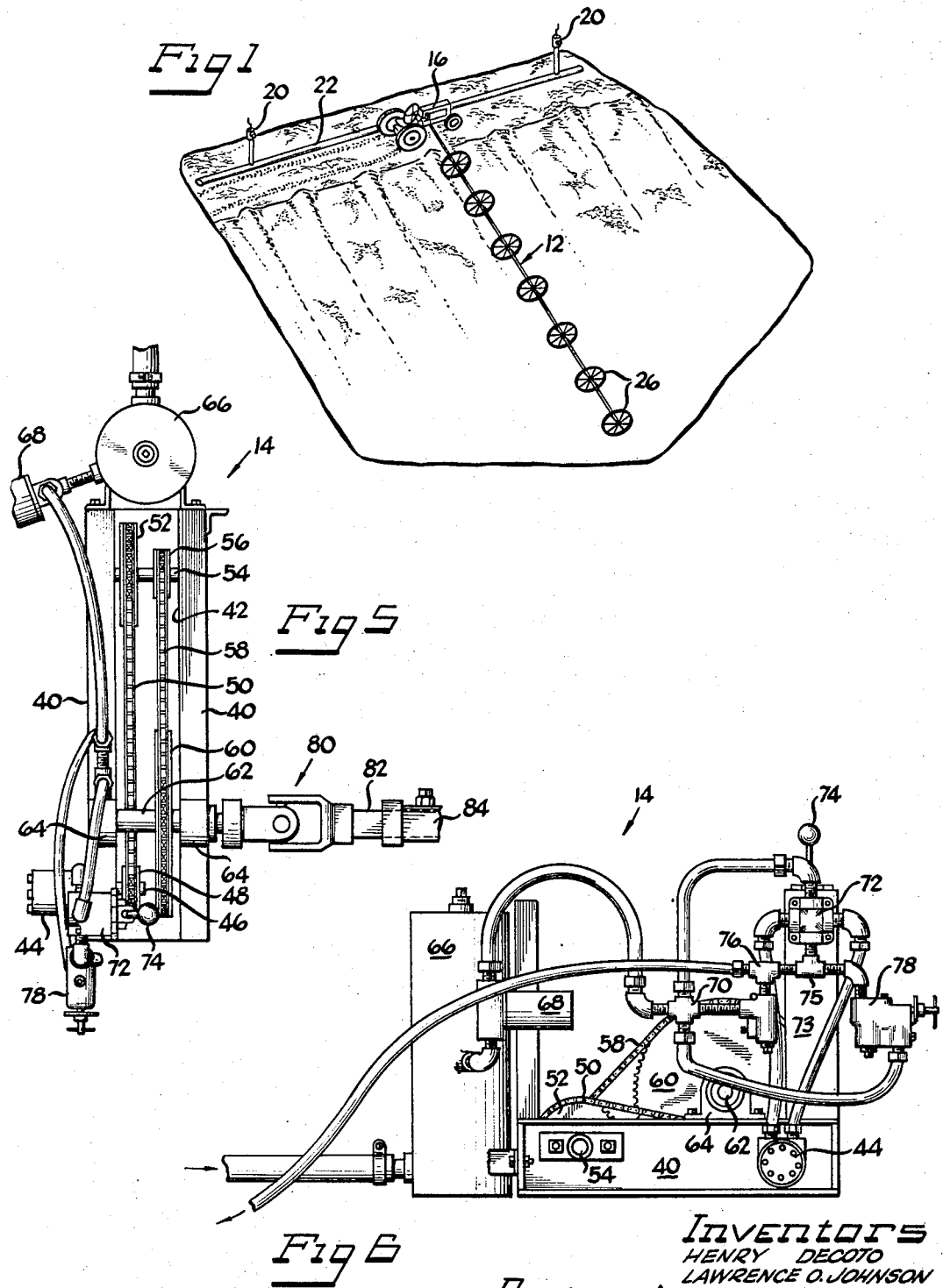
Inventors
HENRY DECOTO
LAWRENCE O. JOHNSON
By Anderson, Luedeka, Fitch, Even & Tabin
Atty's

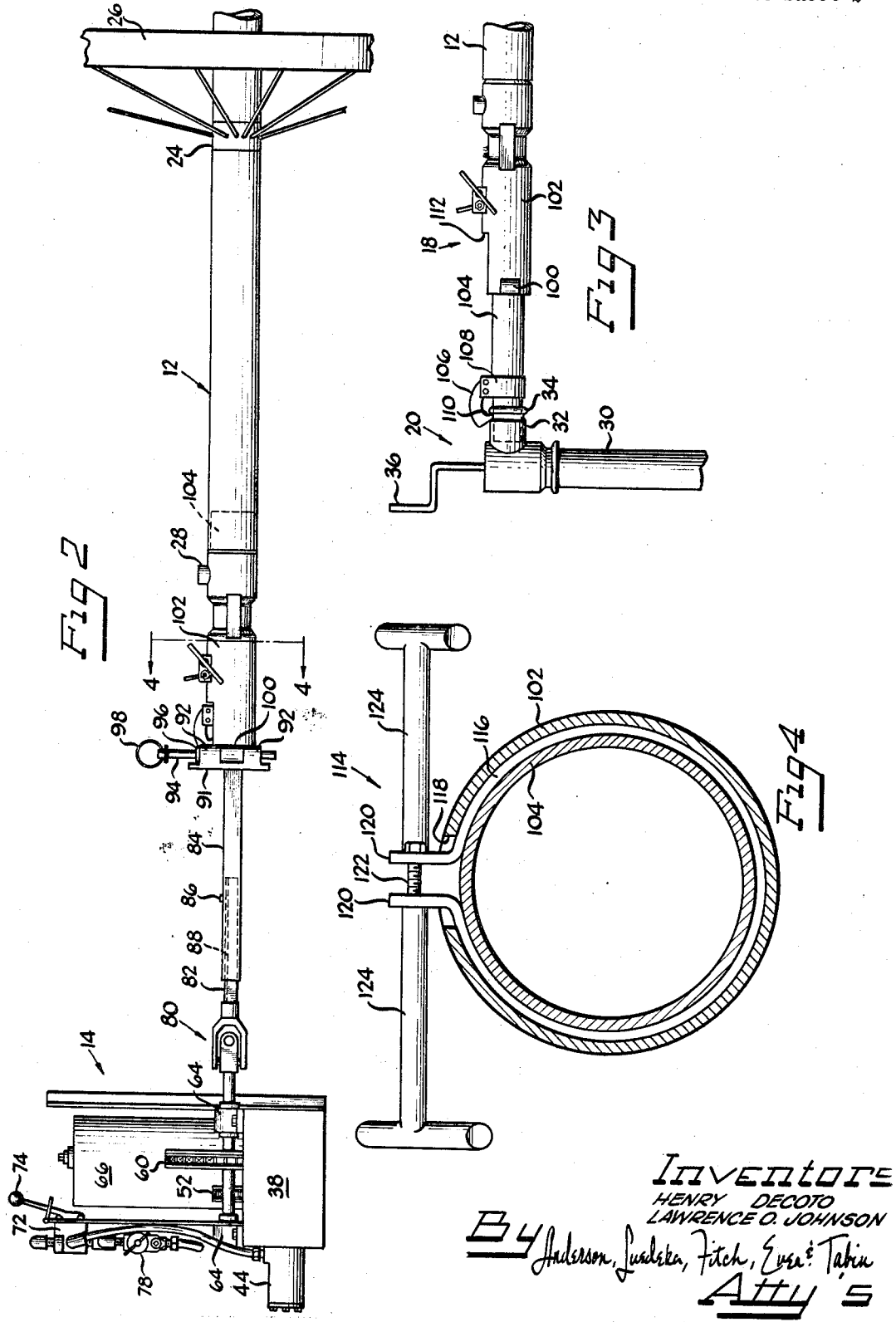

United States Patent Office 3,385,315
Patented May 28, 1968

3,385,315
IRRIGATION SYSTEM
Henry Decoto and Lawrence O. Johnson, Yakima, Wash., assignors to Decoto Brothers Irrigation Division, Inc., Yakima, Wash., a corporation of Washington
Filed Feb. 16, 1965, Ser. No. 433,122
5 Claims. (Cl. 137—344)

ABSTRACT OF THE DISCLOSURE

Apparatus for irrigating a field by means of an elongated wheeled pipeline, including a wheeled self-powered vehicle, a drive unit mounted on the vehicle having a drive shaft, and means on the vehicle for applying to the drive shaft a torque which is independent of the torque applied to one of the wheels of said vehicle. Coupling means are also provided for releasably connecting one end of the pipeline to the drive shaft.

---

The present invention relates generally to apparatus for moving an elongated lateral wheeled irrigation pipeline between spaced apart outlet valves of a water main and for effecting a connection of one end of the pipeline to either the outlet valve or a driving means.

A frequently used method of irrigating a large area or field is through the use of a long water-carrying pipeline which extends laterally across the field and is adapted to have sprinklers mounted at various points along its length and to be connected at one end to a water main. Large areas may be thus irrigated in a relatively short time if the pipeline is sufficiently long to span a substantial area of the field and if it can be moved transversely of its length for successive connection to each of a series of water main outlets arranged along an edge of the field.

The movement of such an irrigation pipeline across a field and between outlets has been facilitated by equipping the pipeline with a plurality of large diameter wheels at spaced intervals along the length of the line. The line passes generally through the center of, and is fixedly connected to, these wheels so that the pipeline may be moved by merely rotating the pipeline as an axle. When the pipeline is connected to one of the outlet valves of the water main and the outlet opened, water is distributed by the pipeline through the sprinklers across the width of the field. When sufficient water has been distributed, the outlet is closed, the pipeline is disconnected from the outlet valve and drained, and the wheeled pipeline is moved to the next water outlet valve.

Several approaches have been made to the problem of moving the line across the field from one outlet valve to another. The crudest method is, of course, manual. In other methods, a gasoline or electrically powered mover is placed adjacent the center of the line, thus causing the operator to walk repeatedly between the center and one end of the line as the line is moved, connected, disconnected and moved again.

Frequently, the movement of the wheeled pipeline is accomplished by a direct connection between one end of the pipeline and a tractor, as by chains and sprockets, thus causing the speed of rotation and, hence, the speed of movement of the line to be directly dependent upon the speed of the tractor. This method of moving the pipeline is not satisfactory because of the tendency of the line to bow or sway into a curved rather than a straightline configuration. This bowing effect, which is caused by the tendency of the center of the line to lag the ends as the line is advanced, makes it more difficult to move the line and, further, imposes a rather severe strain on the pipeline itself. However, when the rotation of the line is directly dependent upon the movement of the tractor, it is not possible to eliminate the bow.

Also, the manner in which the previously available pipelines were connected to the tractor was not entirely satisfactory in previously available systems.

Accordingly, a primary object of the present invention is the provision of novel and improved irrigating apparatus.

Another object of the present invention is to provide novel and improved apparatus for readily and effectively moving an elongated wheeled lateral irrigation pipeline in a straightline configuration between successive positions.

A further object of the invention is the provision of an improved means for facilitating interconnection of a movable pipeline with a driving means without interfering with a connection to a water main outlet.

A still further object of the present invention is the provision of a novel and improved apparatus for moving a wheeled pipeline, which apparatus is simple, economical, rugged, durable and trouble-free in operation.

Other objects and advantages of the present invention will become more apparent from the following description and the associated drawings, wherein:

FIGURE 1 is a perspective view of an irrigation apparatus showing various features of the present invention as the apparatus might appear on a field to be irrigated;

FIGURE 2 is an enlarged partially broken away side elevational view of portions of the irrigating apparatus shown in FIGURE 1;

FIGURE 3 is an enlarged fragmentary side elevational view showing a connection between portions of the apparatus and a water main outlet;

FIGURE 4 is an enlarged sectional elevational view taken along line 4—4 of FIGURE 2; and FIGURES 5 and 6 are enlarged fragmentary plans and elevational views respectively of a portion of the apparatus of FIGURE 2.

Briefly, an irrigation apparatus 10, as shown in the drawings, includes a wheeled lateral pipeline 12 which is moved from successive positions across the field being irrigated by a hydraulic drive unit 14 mounted on a tractor 16. The drive unit 14 is capable of moving the pipeline at a speed and in a direction generally independent of the speed and direction of movement of the tractor, thereby making it possible to impart additional rotation to the line so as to eliminate bowing thereof and reduce the likelihood of damage to the line. One end of the pipeline 12 is provided with a coupling arrangement 18 which facilitates attachment of the pipeline to either the drive unit 14 or to an outlet 20 of a nearby water main 22.

More particularly, the elongated tubular hollow pipeline 12 extends through hubs 24 of each of a plurality of large diameter wheels 26 located at spaced intervals longitudinally of the pipeline. The pipeline is preferably freely rotatable within the hubs of the wheels adjacent the tractor so as to permit slippage between the pipeline and hub as the pipe rotates, thereby allowing for a twist in the line as it is placed in torsion. The remaining wheels are keyed at their hubs to the pipeline so as to be rotatable therewith. In accordance with conventional practice, the pipeline 12 is provided with a plurality of sprinkler outlets 28 which are arranged longitudinally of the line.

The water is supplied to the pipeline 12 from the water main 22 which conventionally extends in adjacent and parallel relation to the edge of the field to be irrigated. Thus, the water main 22 extends transversely to the pipeline 12 and in line with the direction of movement of the pipeline. The illustrated water main 22 is provided with a plurality of the outlets 20 which are spaced along the water main 22 at determined intervals (FIG. 1). Each of the outlets 20 is adapted to be connected to one end of the pipeline 12 and includes a vertical pipe 30 (FIG. 3) and a faucet 32 which projects laterally from the pipe 30 adjacent its upper end. The faucet 32 is adapted to receive the coupling arrangement 18 and includes a bead 34 adjacent its outer edge for engagement with a portion of the coupling arrangement, as will become apparent shortly. The flow of water outwardly through the faucet 32 is controlled by a valve carried at the upper end of the pipe 30 and operated by a handle 36.

As shown best in FIGURE 1, when one end of the pipeline 12 is connected to an outlet 20 and the outlet is opened, water is thereby provided to an area or strip of field extending across the field from that outlet. The arrangement of the sprinkler outlets 28 in the pipeline and the water pressure may be such as to provide a flow or supply of water to a relatively wide area. The pipeline is then moved to successive outlets 20 which are sufficiently spaced so that the entire field is provided with the desired degree of irrigation.

The drive unit 14, which is shown in the drawings as mounted upon a level surface of the tractor 16, in a level position, propels the wheeled pipeline 12 by rotational driving connection to the pipeline itself. It is selectively operable at different speeds independent of the speed of the tractor and is therefore capable of moving the pipeline in a direction and at a speed which is generally independent of the speed and precise direction of movement of the tractor, the tractor merely serving as a platform for the drive unit.

More specifically, the drive unit includes a base 38 formed of a pair of horizontally spaced disposed beams 40 defining an intermediate channel 42. Mounted on the outer wall of one of the beams 40 is a hydraulic motor 44 which includes a shaft 46 (FIG. 5) which projects inwardly of the channel 42 and has affixed thereto a sprocket 48 located within the channel. The sprocket 48 is connected by means of a link chain 50 to a sprocket 52 keyed to a shaft 54 disposed within the channel and rotatably mounted on the base 38 in parallel relation to the shaft 46 of the motor. The shaft 54 also has keyed to it a sprocket 56 connected by means of a link chain 58 to a sprocket 60 keyed to a shaft 62 rotatably journalled in bearing blocks 64 mounted on the upper surface of the base. The shaft 62 is drivingly connected to the pipeline 12; the diameters of the sprockets 48, 52, 56 and 60 are such as to effect a speed reduction between the shaft 46 of the motor and the drive shaft 62.

Hydraulic power is supplied to the motor by means of a pump (not shown) mounted on the tractor and connected through an accumulator 66 and a filter 68 to one inlet of a cross fitting 70. One outlet of the cross fitting is connected to the inlet of a four-way valve 72 mounted on a control tower 73 and operated by a handle 74. The valve 72 is connected to the hydraulic motor 44 and is capable of providing fluid flow in either of two directions to the motor so as to rotate the drive shaft 62 in either a forward or reverse direction. The outlet of the four-way valve is connected through a pair of T-fittings 75 and 76 back to the pump.

The other outlet of the cross fitting 70 is connected to a flow control valve 78 which, in turn, is connected through the pair of T-fittings 75 and 76. The flow control valve, in effect, provides a by-pass circuit for fluid from the pump and accumulator. When the valve is fully open, the fluid bypasses the four-way valve, thus preventing fluid from being supplied to the motor and causing the drive shaft to remain stationary. When the valve 78 is fully closed, all of the fluid is supplied to the motor and the drive shaft 62 is rotated at full speed. Intermediate positions of the valve 78, of course, permit intermediate speeds.

Power is transferred from the drive shaft 62 to the pipeline 12 by connection of the shaft 62 through a universal joint 80 to an intermediate shaft 82 of square cross section (FIG. 2). The intermediate shaft 82 is slidably telescoped within an intermediate tube 84 of similar cross section. A stop pin 86 is threaded through a suitable opening in the tube 84 to permit its lower end to be received within a channel 88 provided in the intermediate shaft 82. Interaction between the stop pin 86 and an end wall of the channel limits the extent to which the shaft can be withdrawn from the tube 84. Movement of the shaft into the tube is limited by the universal joint 80 connected to the outer end of the shaft.

By virtue of this arrangement, the tube 84 may be extended a short distance for connection to the pipeline 12. Accordingly, this feature, plus the use of the universal joint 80, obviates the need for precise positioning of the tractor relative to the pipeline 12 for connection of the pipeline to the drive unit 14. In addition, these features permit some variation in the path of the tractor relative to the position of the pipeline while the tractor is moving.

That end of the intermediate tube 84 which is farthest from the universal joint 80 has affixed thereto a flat plate 91 disposed in transverse relation to the axis of the tube 84. A pair of vertically spaced socket-defining knuckles 92 are affixed to opposite sides of the plate, with each pair being adapted to receive a connecting pin 94. The connecting pin 94 is formed of heavy stock and has a flange 96 projecting radially from its side walls to limit downward movement of the pin into the sockets. A ring 98 is affixed to the upper end of the pin to facilitate the grasping and removal thereof.

The previously described components, namely, the drive unit 14, the drive shaft 62, the universal joint 80, the shafts 82 and 84 and the plate 91, are all permanently mounted on the tractor 16. Means are provided on the pipeline 12 for effecting interconnection with the plate 91 and comprise a knuckle 100 mounted adjacent each side of a pipe 102 which is securely affixed, as by welding, to one end of the pipeline 12. The knuckles 100 are adapted to fit intermediate the knuckles 92 of each pair mounted on the plate 91 and define a socket to receive a pin 94. Hence, when the pins 94 are in place, the pipe 102 and the pipeline 12 are securely fixed to the plate 91 and, consequently, drivingly connected to the drive unit 14.

As shown in FIGURES 2 and 3, a cylindrical extensible pipe section 104 is telescoped within the outer end of the pipe 102. The section 104 is adapted to be maintained fully within the pipe 102 when the latter is connected to the drive unit 14, as previously described. However, when the pipeline 12 has been located adjacent the desired outlet 20, the pins 94 are removed to thereby disconnect the pipeline from the drive unit 14, the tractor is moved, and the extensible section 104 is extended outwardly toward the outlet and connected thereto, as shown in FIGURE 3.

Connection between the extensible pipe section 104 and the outlet 20 of the water main 22 is effected by telescopic reception of the section 104 within the faucet 32 of the outlet, and by a latch 106 which is pivotally mounted on a collar 108 which encircles the pipe 104 at a point spaced inwardly from the outer end thereof. The latch 106 includes a hook 110 at its outer end which engages the bead 34 of the faucet. The latch, which projects upwardly above the top of the extensible section 104, is received in a slot 112 in the top wall of the pipe 102 when the pipe 104 is fully telescoped within the pipe 102, as when the pipe 102 is connected to the drive unit 14 of the tractor 16.

To prevent the pipe section 104 from being forced out of the faucet by the water pressure and thus caused to again re-enter the pipe 102, a clamp 114 is provided and includes a band 116 which is disposed within the pipe 102 in encircling relation to the extensible pipe section 104 and emerges from a slot 118 in the top wall of the pipe 102 in the form of a pair of flanges 120. The flanges are provided with a pair of aligned openings which receive threaded bolts 122 connected at one end to T-bar tighteners 124. Thus, when the bolts 122 are tightened, the band 116 is caused to clamp the pipe section 104. Since the band 116 is restrained within the slot 118 of the pipe 102, it restrains both longitudinal and rotational movement of the pipe 104.

Thus, a simple, strong, durable apparatus is provided for moving a lateral wheeled irrigation pipeline across a field to successive locations with an improved connection to the driving means. The pipeline is rendered connectable to appropriate water outlets at each of the locations. The drive unit of the apparatus is mounted on a tractor but operates independently of the speed and direction of the tractor so as to permit rotation to be imparted to the pipeline which is independent of the speed of travel of the tractor.

Various modifications and changes may be made in the illustrated structure without departing from the spirit and scope of the present invention. Various features of the present invention are set forth in the following claims.

What is claimed is:

1. In an apparatus for irrigating a field or the like by means of an elongated pipeline adapted to carry water throughout its length, said pipeline being supported by at least one wheel rotatably secured to said pipeline so as to rotate about the axis thereof and thereby render said pipeline movable transversely of its length incident to its rotation; means for rotating said pipeline comprising a vehicle supported by wheels, means for applying a driving torque to at least one wheel of said vehicle to effect traveling movement thereof, a drive unit mounted on said vehicle and including a drive shaft, means on said vehicle for applying to said drive shaft torque which is independent of the torque applied to said vehicle wheel, and coupling means for releasably connecting one end of said pipeline to said drive shaft so that rotation of said drive shaft serves to rotate and thereby move said pipeline.

2. An apparatus in accordance with claim 1, wherein said means for applying a torque to said drive shaft includes a hydraulic motor and manually operable valve means for controlling the flow of fluid to said motor so as to permit the amount of torque applied to said drive shaft to be controlled.

3. An apparatus in accordance with claim 1, wherein said coupling means is extendable and contractable to permit the distance between said one end of said pipeline and said drive unit to vary while torque is applied to said pipeline.

4. An apparatus in accordance with claim 3, wherein said coupling means is also effective to releasably connect said one end of said pipeline to a water outlet.

5. An apparatus in accordance with claim 4, wherein said coupling means includes a pipe section telescopically arranged with respect to said pipeline adjacent said one end thereof so as to permit it to be moved longitudinally with respect to said pipeline, and selectively operable means for precluding relative movement between said pipe section and said pipeline.

References Cited

UNITED STATES PATENTS

| | | | |
|---|---|---|---|
| 2,516,711 | 7/1950 | Mansur | 239—212 X |
| 2,628,863 | 2/1953 | Maggart | 239—212 X |
| 2,665,169 | 1/1954 | Tipton | 137—344 |
| 2,665,941 | 1/1954 | Idler | 137—344 |
| 2,807,500 | 9/1957 | Clayton | 239—212 X |
| 3,202,172 | 8/1965 | Bergeron et al. | 137—344 |
| 3,217,737 | 11/1965 | Jensen | 137—344 |
| 3,245,595 | 4/1966 | Purtell | 137—344 X |
| 3,255,968 | 6/1966 | Stafford | 137—344 X |

M. CARY NELSON, *Primary Examiner.*

S. SCOTT, *Assistant Examiner.*